(12) United States Patent
Chakra et al.

(10) Patent No.: US 9,330,085 B2
(45) Date of Patent: May 3, 2016

(54) ASSISTING USERS TO GENERATE DESIRED MEME IN DOCUMENT

(75) Inventors: Al Chakra, Apex, NC (US); Liam Harpur, Dublin (IE); Daniel J. McCloskey, Dublin (IE); Simon P. O'Doherty, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 12/969,081

(22) Filed: Dec. 15, 2010

(65) Prior Publication Data

US 2012/0159315 A1 Jun. 21, 2012

(51) Int. Cl.
*G06F 17/20* (2006.01)
*G06F 17/27* (2006.01)
*G06Q 30/02* (2012.01)

(52) U.S. Cl.
CPC ........ *G06F 17/2745* (2013.01); *G06F 17/2705* (2013.01); *G06Q 30/02* (2013.01)

(58) Field of Classification Search
CPC ..................................................... G06Q 30/02
USPC ........................... 715/255, 256, 259; 709/224
See application file for complete search history.

(56) References Cited

U.S. PATENT DOCUMENTS

| | | | |
|---|---|---|---|
| 7,739,261 B2 | 6/2010 | Zeng et al. | |
| 7,996,210 B2* | 8/2011 | Godbole et al. | 704/9 |
| 2007/0214097 A1 | 9/2007 | Parsons et al. | |
| 2007/0282874 A1* | 12/2007 | Metcalfe | 707/101 |
| 2008/0209320 A1 | 8/2008 | Mawhinney et al. | |
| 2009/0192896 A1 | 7/2009 | Newton et al. | |
| 2010/0070485 A1 | 3/2010 | Parsons et al. | |
| 2010/0313258 A1* | 12/2010 | Chaudhuri et al. | 726/9 |

FOREIGN PATENT DOCUMENTS

| | | |
|---|---|---|
| CN | 1987852 | 6/2007 |
| CN | 101030221 | 9/2007 |
| EP | 1276061 A1 | 1/2003 |

OTHER PUBLICATIONS

Levon Lloyd et. al., Lydia: A System for Large-Scale News Analysis, 2005, State University of New York at Stony Brook, 6 pages.*
Tanaka et al., "Knowledge Media and Meme Media Architecture from the Viewpoint of the Phenotype-Genotype Mapping," Oct. 2006.
Koenig, Thomas, "Routinizing Frame Analysis through the Use of CAQDAS," RC33 Amsterdam, Aug. 16-19, 2004.
JISC, "Using Text Mining for Frame Analysis of Media Content," Feb. 2, 2009.

* cited by examiner

*Primary Examiner* — Mohammed-Ibrahim Zuberi
(74) *Attorney, Agent, or Firm* — Robert A. Voigt, Jr.; Winstead, P.C.

(57) ABSTRACT

A method, system and computer program product for assisting users to generate the desired meme in a document. A document is scanned to identify parts of speech, numerical text or numbers and images (collectively the "terms") that provide positive/negative memes. A score for each of these terms is assigned. A score may then be assigned to each designated primary object (e.g., individual, company) discussed in the document using the scores assigned to the identified terms. Options may then be provided to modify the document to provide the type of meme (e.g., positive or negative meme) desired by the author to be associated with the particular designated primary object. Upon receiving a selection of one or more of these options, the document is modified accordingly to generate the desired meme in the document.

19 Claims, 8 Drawing Sheets

| | Paragraph 1 | | Paragraph 2 | | Paragraph 3 | |
|---|---|---|---|---|---|---|
| | Person 1 | Person 2 | Person 1 | Person 2 | Person 1 | Person 2 |
| Keywords | crashing -1 | | down -1 | | monitoring +1 | |
| | problem -1 | | took some time -1 | | appears fine +1 | |
| | shutting | -1 | found | +1 | monitor | +1 |
| | down | -1 | solution | +1 | | |
| | went | -1 | out of date -1 | | | |
| | proceeded +1 | | updated | +1 | | |
| | did not | -1 | started | +1 | | |
| | started | +1 | working | +1 | | |
| | up +1 | | fine | +1 | | |
| | crashed -1 | | | | | |
| Total keyword score | -4 (Negative) | | 3 (Positive) | | 3 (Positive) | |
| First person score | -1 | | 1 | | 2 | |
| Second person score | -3 | | 2 | | 1 | |
| Favors | First person | | Second person | | First person | |

John and I went out to the customer on Monday morning to find the crashing problem. John started by shutting down the server processes while I went through the hardware. John proceeded to review the customers logs. I did not find anything of note. We put on debug options and started up the server again. It crashed after 10 minutes.

We brought the server down and went through the logs, which took some time. John finally found the solution was with an out of date graphic driver. We updated the graphic driver and started the server. After that everything appears to be working fine.

I have been monitoring it for the last hour and appears fine. We will continue to monitor the server for the next week.

FIG. 4A

*John* and *I* went out to the customer on Monday morning to find the crashing problem. *John* started by shutting down the server processes while *I* went through the hardware. *John* proceeded to review the customers logs. *I* did not find anything of note. *We* put on debug options and started up the server again. It crashed after 10 minutes.

*We* brought the server down and went through the logs, which took some time. *John* finally *found* the *solution* was with an out of date graphic driver. *We* updated the graphic driver and started the server. After that everything appears to be working fine.

I have been monitoring it for the last hour and appears fine. *We* will continue to monitor the server for the next week.

FIG. 4B

| Keywords | Paragraph 1 | | | Paragraph 2 | | | Paragraph 3 | | |
|---|---|---|---|---|---|---|---|---|---|
| | | Person 1 | Person 2 | | Person 1 | Person 2 | | Person 1 | Person 2 |
| | crashing | −1 | | down | | −1 | monitoring | +1 | |
| | problem | −1 | | took some time | | −1 | appears fine | +1 | |
| | shutting | | −1 | found | | +1 | monitor | | +1 |
| | down | | −1 | solution | | +1 | | | |
| | went | | −1 | out of date | | −1 | | | |
| | proceeded | +1 | | updated | +1 | | | | |
| | did not | | −1 | started | | +1 | | | |
| | started | | +1 | working | | +1 | | | |
| | up | +1 | | fine | | +1 | | | |
| | crashed | −1 | | | | | | | |
| Total keyword score | −4 (Negative) | | | 3 (Positive) | | | 3 (Positive) | | |
| First person score | −1 | | | 1 | | | 2 | | |
| Second person score | −3 | | | 2 | | | 1 | | |
| Favors | First person | | | Second person | | | First person | | |

FIG. 4C

John and I went out to the customer on Monday morning to find the crashing problem. John started by shutting down the server processes while I went through the hardware. John proceeded to review the customers logs. I did not find anything of note. We put on debug options and started up the server again. It crashed after 10 minutes.

FIG. 4D

John and *I* went out to the customer on Monday morning to find the cause of crashing problem. *John* started by shutting down the server processes. *I* had a look at the hardware. *John* reviewed the customers logs.

The hardware was OK. *We* put on debug options and tried the server again. It lasted for 10 minutes.

*We* brought the server down and went through the logs, *We* finally found the solution was with an old graphic driver. *We* updated the graphic driver and started the server. After that everything appears to be working fine.

I have been monitoring it for the last hour and appears fine. *We* will continue to monitor the server for the next week.

FIG. 4E

ASSISTING USERS TO GENERATE DESIRED MEME IN DOCUMENT

TECHNICAL FIELD

The present invention relates to meme detection, and more particularly to assisting users to generate the desired meme in a document (e.g., article, e-mail, blog).

BACKGROUND

A meme is an idea, behavior, style or usage that spreads from person to person within a culture. A meme may also be defined as a unit of cultural ideas, symbols or practices, which can be transmitted from one mind to another through writing, speech, gestures, rituals or other imitable phenomena. Examples of memes include melodies, catch-phrases, fashion, and the technology of building arches.

Recently, memes have been used in the blogging community to change people's perspectives about a particular product, competitor, politician, person, etc. For example, over a decade ago, bloggers used a negative meme (negative meme referring to implanting in people's mind a negative association) in their blogs that Java® was slow. While numerous objective bench marks have shown that Java® has not been slow in comparison to other competitor software products for over a decade, the belief that Java® is slow was still widely believed until fairly recently.

While authors, such as bloggers, have attempted to write documents (e.g., article, blog) in a manner that produces a desired meme, there are currently no tools to assist the authors in constructing a document using parts of speech, images, numbers, and so forth effectively to accomplish the desired meme or cultural transformation.

BRIEF SUMMARY

In one embodiment of the present invention, a method for assisting users to generate the desired meme in a document comprises evaluating a document for at least one designated primary object within the document, where each of the at least one designated primary objects is evaluated in accordance with a type of meme. The method further comprises identifying terms providing positive and/or negative memes within the document, the terms being at least one of parts of speech, images, numerical text or numbers. Additionally, the method comprises assigning a score for each identified term. Furthermore, the method comprises assigning a score for each of the at least one designated primary objects based on the score for each identified term. In addition, the method comprises providing, by a processor of a computing system, one or more options to modify the document in accordance with the type of meme for each of the at least one designated primary objects.

Other forms of the embodiment of the method described above are in a system and in a computer program product.

In another embodiment of the present invention, a method for assisting users to maintain the desired meme established in a document comprises reviewing a document posted on a network in the context of its environment. The method further comprises identifying a change in the effectiveness of a meme of the document as a result of its environment. In addition, the method comprises informing, by a processor of a computing system, an author of the document that the effectiveness of the meme of the document has been changed in response to identifying the change in the effectiveness of the meme of the document.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIGS. 4A-4E depict the content of a message being modified to provide the desired meme using the method of FIGS. 3A-3B.

DETAILED DESCRIPTION

The present invention comprises a method, system and computer program product for assisting users to generate the desired meme in a document. In one embodiment of the present invention, a document to be evaluated for positive/negative memes for designated primary objects (e.g., subjects that are the focus of the document) is received. The identifiers (e.g., pronouns, names) used to identify these designated primary objects in the document is received from the author of the document. The type of meme (e.g., positive or negative meme) to be associated with each of these designated primary objects (e.g., individual, company) is also received from the author of the document. The document is scanned to identify parts of speech (e.g., subjects, verbs, adjectives, adverbs), numerical text or numbers and images (collectively referred to herein as the "terms") that provide positive/negative memes. A score for each of these terms, where such scores may be weighted based on its ability in establishing a negative or positive meme, is assigned. A score may then be assigned to each designated primary object using the scores assigned to the identified terms based on a variety of factors, such as the closeness in location of the identifiers of the designated primary objects to the terms that provide the positive/negative memes. Options may then be provided to modify the document to provide the type of meme desired by the author to be associated with the particular designated primary object. For example, synonyms may be suggested to replace various parts of speech to improve the negativeness or positiveness of the meme. In another example, the paragraph layouts/margins may be adjusted to more effectively establish a positive/negative meme for the designated primary objects. Upon receiving a selection of one or more of these options, the document is modified accordingly to generate the desired meme in the document.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
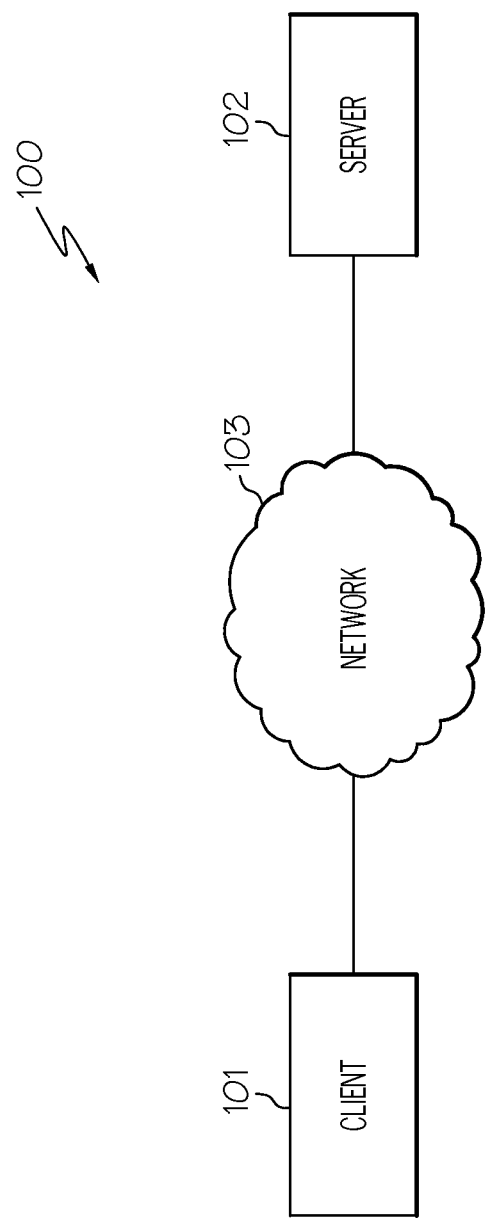
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes a client 101 in communication with a server 102 via a network 103 (e.g., local area network, wide area network). Client 101 and server 102 are interconnected with network 103 via any medium type (e.g., wireless, wired). Furthermore, client 101 may be any type of device (e.g., portable computing unit, personal digital assistant (PDA), smartphone, desktop computer system, workstation, Internet appliance and the like) configured with the capability of connecting to network 103 and consequently communicating with server 102. FIG. 1 is not to be limited in scope to any one particular embodiment.

In connection with "meme generation," client 101 is a computing system used by a user to generate a document to accomplish the desired meme or cultural transformation as discussed in more detail below in connection with FIGS. 3A-3B and 4A-4E. A description of one embodiment of a hardware configuration of client 101 is provided below in connection with FIG. 2. In one embodiment, server 102 may be a web server used to host websites, including blogs, where the meme generated documents created by the user of client 101 are posted. In another embodiment, server 102 may be a unit configured to detect any changes to the desired meme in the document once it has been posted to the network as discussed further below in connection with FIG. 5. A description of one embodiment of a hardware configuration of server 102 is also provided below in connection with FIG. 2.

Figure 2:
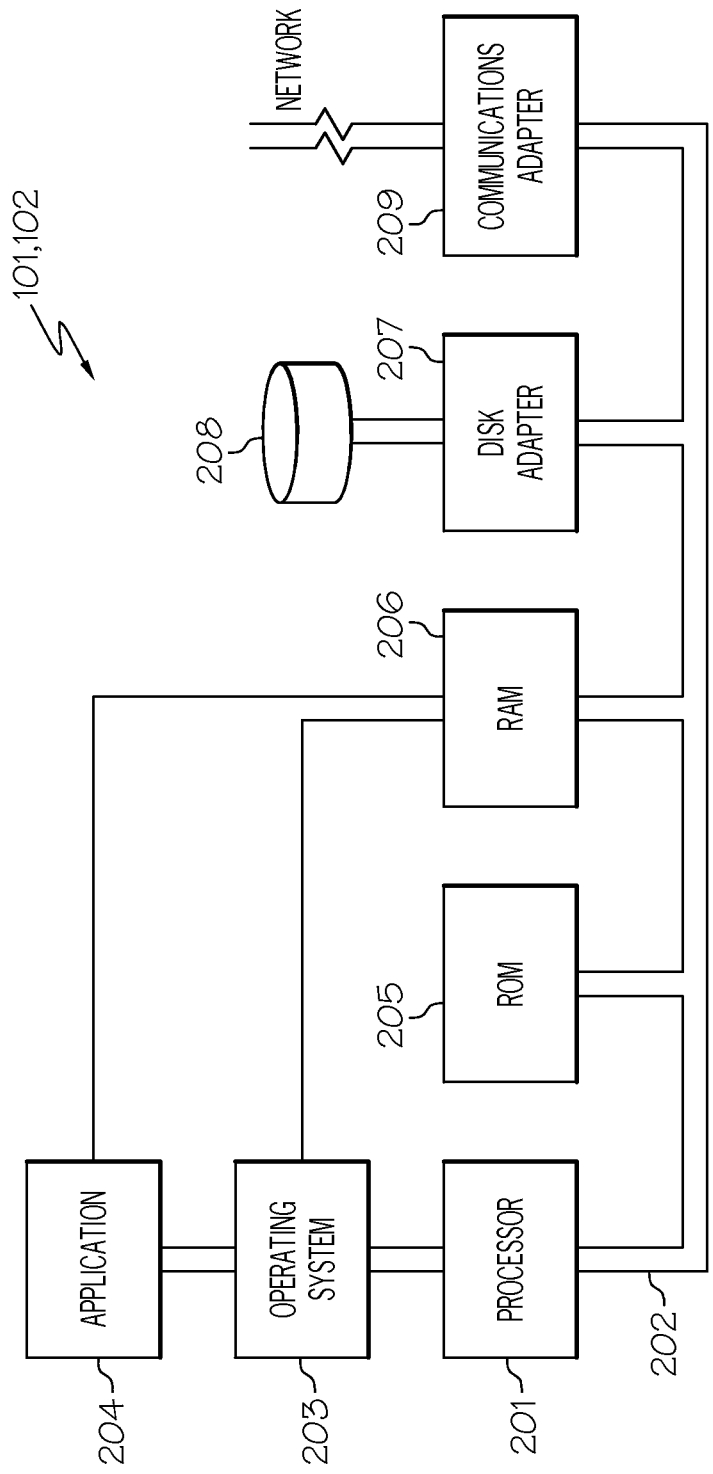
FIG. 2 illustrates a hardware configuration of a client and server configured in accordance with an embodiment of the present invention.

Referring now to FIG. 2, FIG. 2 illustrates a hardware configuration of client 101 (FIG. 1), server 102 (FIG. 1) which is representative of a hardware environment for practicing the present invention. Referring to FIG. 2, client 101, server 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 of client 101 may include, for example, a program for assisting users to generate the desired meme in a document, as discussed further below in association with FIGS. 3A-3B and 4A-4E. Application 204 of sever 102 may include, for example, a program for detecting any changes to the desired meme in the document once it has been posted to the network as discussed further below in association with FIG. 5.

Referring again to FIG. 2, read-only memory ("ROM") 205 is coupled to system bus 202 and includes a basic input/output system ("BIOS") that controls certain basic functions of client 101, server 102. Random access memory ("RAM") 206 and disk adapter 207 are also coupled to system bus 202. It should be noted that software components including operating system 203 and application 204 may be loaded into RAM 206, which may be client's 101, server's 102 main memory for execution. Disk adapter 207 may be an integrated drive electronics ("IDE") adapter that communicates with a disk unit 208, e.g., disk drive. It is noted that the program for assisting users to generate the desired meme in a document, as discussed further below in association with FIGS. 3A-3B and 4A-4E, may reside in disk unit 208 or in application 204. It is further noted that the program for detecting any changes to the desired meme in the document once it has been posted to the network as discussed further below in association with FIG. 5, may reside in disk unit 208 or in application 204.

Client 101, server 102 may further include a communications adapter 209 coupled to bus 202. Communications adapter 209 of client 101 interconnects bus 202 with an outside network (network 103) thereby enabling client 101 to communicate with server 102. Furthermore, communications adapter 209 of server 102 interconnects bus 202 with an outside network (network 103) thereby enabling server 102 to communicate with client 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, while authors, such as bloggers, have attempted to write documents (e.g., article, blog) in a manner that produces a desired meme, there are currently no tools to assist the authors in constructing a document using parts of speech, images, numbers, and so forth effectively to accomplish the desired meme or cultural transformation.

Figure 3A:
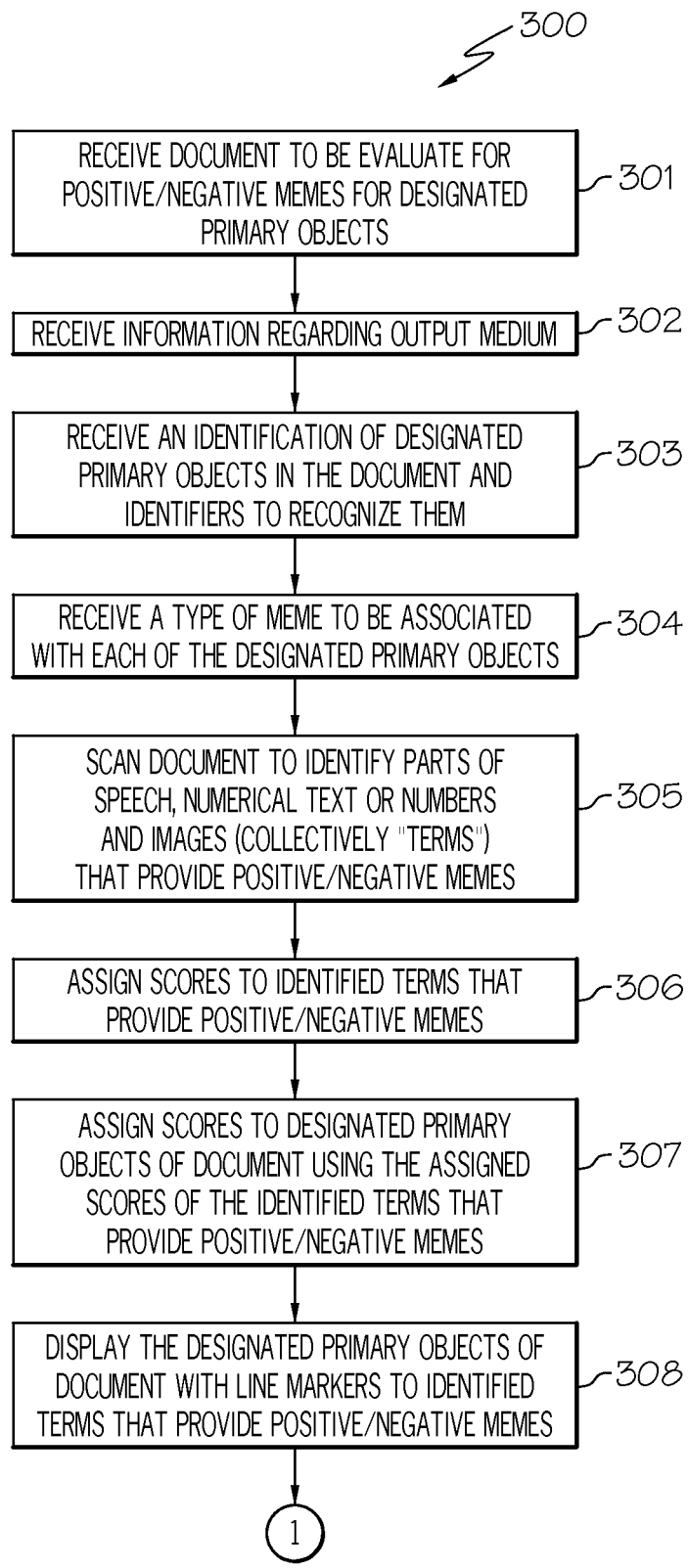
FIGS. 3A-3B are a flowchart of a method for assisting users to generate the desired meme in a document in accordance with an embodiment of the present invention.
Figure 3B:
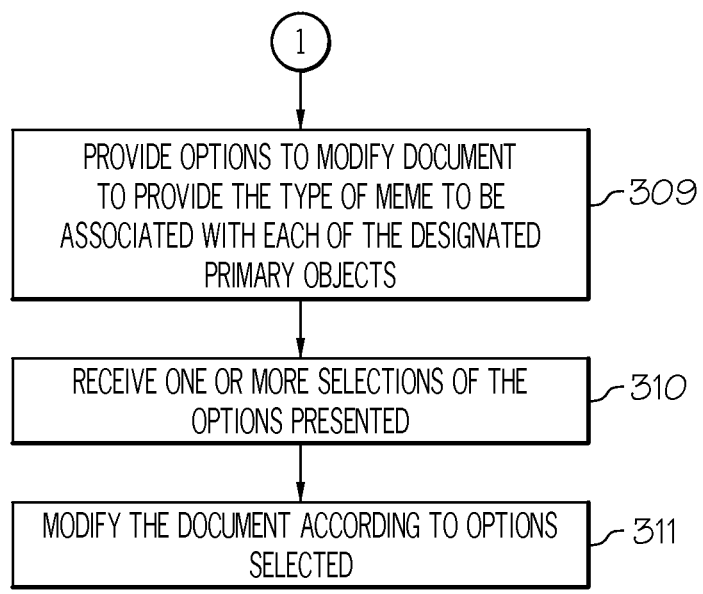

The principles of the present invention provide a tool for assisting authors in constructing a document (e.g., news article, e-mail, blog commentary) to accomplish the desired meme or cultural transformation are discussed below in connection with FIGS. 3A-3B and 4A-4E. FIGS. 3A-3B are a flowchart of a method for assisting users to generate the desired meme in a document. FIGS. 4A-4E depict the content of a message being modified to provide the desired meme using the method of FIGS. 3A-3B.

Referring to FIGS. 3A-3B, as stated above, FIGS. 3A-3B are a flowchart of a method 300 for assisting users to generate the desired meme in a document in accordance with an embodiment of the present invention. FIGS. 3A-3B will be discussed in conjunction with FIGS. 4A-4E, which depict the content of a message being modified to provide the desired meme using the method of FIGS. 3A-3B in accordance with an embodiment of the present invention.

Referring to FIG. 3A, in conjunction with FIGS. 1-2, in step 301, client 101 receives a document to be evaluated for positive and/or negative memes for designated primary objects. A positive meme refers to implanting a positive association in people's minds; whereas, a negative meme refers to implanting a negative association in people's minds. A designated primary object(s) refers to the subjects of the document (e.g., an individual, a company) that are the focus of the document. For example, referring to FIG. 4A, FIG. 4A is an illustrative sample message whose author desires to be evaluated and improved for positive and/or negative memes for designated primary objects. In the example of FIG. 4A, the designated primary objects of the message are John and Bob, where Bob and John are both software engineers, and where Bob is the author of the message and John is Bob's fellow co-worker.

In step 302, client 101 receives information regarding the output medium (e.g., page size, media format) of the received document after it has been evaluated and modified to generate the desired meme.

In step 303, client 101 receives an identification of the designated primary objects in the document and the identifiers to recognize them. For example, referring to FIG. 4A, the primary objects in the sample message are Bob and John. Bob is identified by the word "I." John is identified by the word "John." Bob and John are both identified by the word "we."

In step 304, client 101 receives a type of meme to be associated with each of the designated primary objects. As discussed above, a meme may be a positive or a negative meme. Referring to the example of FIG. 4A, the author Bob would like a positive meme for himself and a negative meme for John, his fellow co-worker. Bob wishes to convey a negative meme for John without him necessarily realizing it in order to compete against John at the yearly review.

In step 305, client 101 scans the received document to identify parts of speech (e.g., subjects, verbs, adjectives, adverbs), numerical text or numbers and images (collectively referred to herein as the "terms") that provide positive/negative memes as illustrated in FIG. 4B. Referring to FIG. 4B, FIG. 4B illustrates identifying those terms in the sample message that provide positive/negative memes, where those terms that provide a negative meme (e.g., crashed) are shaded darker and those terms that provide a positive meme are italicized (e.g., solution).

In step 306, client 101 assigns scores to the identified terms that provide positive/negative memes. In one embodiment, positive memes are assigned a positive score, while negative memes are assigned a negative score as illustrated in FIG. 4C. Referring to FIG. 4C, FIG. 4C illustrates the scores assigned to the various terms in each paragraph that are associated with each person (discussed further below in connection with step 307). As illustrated in FIG. 4C, each term that provides a negative meme is assigned a value of −1; whereas, each term that provides a positive meme is assigned a value of +1. The total score for the terms in each paragraph is added providing a "total keyword score." Also, the total score for the terms associated with each person (person 1 refers to Bob and person 2 refers to John) in each paragraph is also summed (identified as "first person score" and "second person score" in FIG. 4C). Additionally, the person with the highest numerical score in each paragraph is identified as shown in the row entitled "favors" in FIG. 4C to indicate which person is associated with the most positive terms.

In one embodiment, the score is weighted based on how positive or negative of an association is implanted in people's minds. In one embodiment, scores may be based in part on what is referred to herein as a "heat map," where a heat map identifies the areas of a document, such as a web page, where users are most likely to look via various colors. For example, the color red may indicate where users look the most; whereas, the color gray may indicate areas that did not attract any fixations. Terms that denote a positive or negative meme may be scored higher in areas where users look the most than other areas where users may not be as fixated. In one embodiment, the scores assigned to images may be based on the location of the image in relation to the heat map, the size of the image, the details of the image, the contour mapping of the image, and/or if the image is related to one of the designated primary objects.

In step 307, client 101 assigns scores to the designated primary objects of the document using the assigned scores of the identified terms that provide positive/negative memes based on a variety of factors, including, but not limited to, the closeness in location of the identifiers of the designated primary objects to the terms that provide the positive/negative memes, heat map locations and whether a pronoun or noun is used to identify the designated primary object.

In step 308, client 101 displays the designated primary objects of the document with line markers to the identified terms that provide positive/negative memes as illustrated in FIG. 4D. Referring to FIG. 4D, FIG. 4D illustrates line markers used to identify the terms that provide positive/negative memes in association with the designated primary objects. In one embodiment, the line markers are color coded based on whether the associated term conveys a positive/negative meme.

In step 309, client 101 provides options to modify the document to provide the type of meme to be associated with each of the designated primary objects. For example, referring to the example discussed above in connection with FIG. 4A, the primary objects for the message are Bob and John, where Bob was to have a positive meme and John was to have a negative meme. As a result, client 101 will provide options to modify the document to generate the desired goal in establishing a positive meme for Bob and establishing a negative meme for John. In one embodiment, client 101 may provide synonyms for the parts of speech to improve the negativeness or positiveness of the meme. In one embodiment, client 101 may provide the scores of the suggested synonyms relative to other synonyms and why it was suggested over the other synonyms. In one embodiment, client 101 provides options to adjust the paragraph layouts/margins to more effectively establish a positive/negative meme for the designated primary objects. In one embodiment, client 101 may provide the option of changing the scaling of the images (e.g., provide the option with lighter tones) or moving the image to a different area of the document to more effectively establish a positive/negative meme for the designated primary objects. In one embodiment, client 101 may provide the option to change the numbers to text or vice-versa (e.g., change "23" to "twenty-three") to change the impact of the positiveness or negativeness of the meme. For example, textual numbers may be said to have a neutral impact; whereas, a number may be said to have a positive impact.

In step 310, client 101 receives one or more selections to the options provided by the user that provided the document to be evaluated in step 301.

In step 311, client 101 modifies the document according to the options selected as illustrated in FIG. 4E. Referring to FIG. 4E, FIG. 4E illustrates a modified version of the sample message of FIG. 4A where John is grouped closer to the negative terms while Bob is grouped closer to the positive terms to generate a more positive meme for Bob and a more negative meme for John.

In some implementations, method 300 may include other and/or additional steps that, for clarity, are not depicted. Further, in some implementations, method 300 may be executed in a different order than presented herein, wherein the order presented in the discussion of FIGS. 3A-3B is illustrative. Additionally, in some implementations, certain steps in method 300 may be executed in a substantially simultaneous manner or may be omitted.

In addition to having client 101 assist users to generate the desired meme in a document, the principles of the present invention may be embodied as a server component used for detecting any changes to the desired meme in the document produced in step 311 of FIG. 3B once it has been posted on a network as discussed below in association with FIG. 5.

Figure 5:
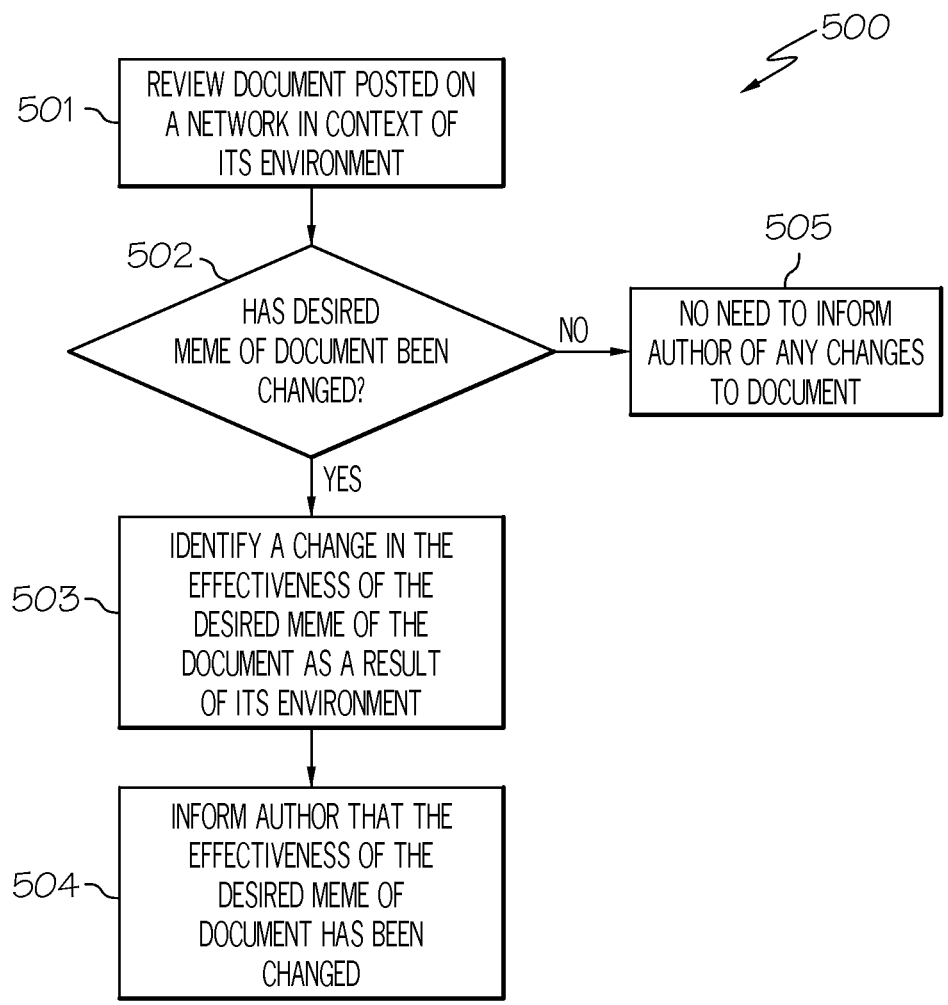
FIG. 5 is a flowchart of a method for detecting any changes to the desired meme in the document once it has been posted to the network in accordance with an embodiment of the present invention.

FIG. 5 is a flowchart of a method 500 for detecting any changes to the desired meme in the document once it has been posted to the network in accordance with an embodiment of the present invention.

Referring to FIG. 5, in conjunction with FIGS. 1-2, in step 501, server 102 reviews the document, such as the document generated in step 311 of FIG. 3B, posted on the network in the context of its environment (e.g., surrounding articles, location on web page). For example, the document generated in step 311 of FIG. 3B may be placed near an advertisement of a competitor's product. The environment, such as the advertisement, may have an impact on the effectiveness of the meme, such as lessening its impact. In another example, the document generated in step 311 of FIG. 3B may be placed at a particular location on a web page. If the document is placed at a location on the web page that is less likely to be viewed by users, then that may have an impact on the effectiveness of the meme. In such scenarios, the environment may have an impact on the effectiveness of the meme.

In step 502, server 102 determines whether the desired meme of the document (document generated in step 311 of FIG. 3B) has been changed. That is, server 102 determines whether the effectiveness of the meme of the document has been affected due to the environment in which the document has been placed. Server 102 may determine whether the effectiveness of the meme of the document has been changed using similar analytics as discussed above in steps 305-307 of FIG. 3A.

If the desired meme of the document has been changed, then, in step 503, server 102 identifies a change in the effectiveness of the desired meme of the document as a result of the environment in which the document has been placed.

In step 504, server 102 informs the author of the document (document generated in step 311 of FIG. 3B) that the effectiveness of the desired meme of the document has been changed. For example, server 102 may inform the user of client 101, which may be the author of the document that was generated in step 311 of FIG. 3B, that the effectiveness of the desired meme of the document has been changed. Server 102 may provide various options of improving the effectiveness of the meme of the document, such as discussed above, in connection with step 309 of FIG. 3B. The author may accept any of these options to improve the effectiveness of the meme of the document as discussed above in connection with step 310 of FIG. 3B. Server 102 may implement these options selected by modifying the document accordingly, such as discussed above in connection with step 311 of FIG. 3B.

Referring to step 501, if, however, the desired meme of the document has not changed, then, in step 505, server 102 does not inform the author of the document of any needed changes to the document.

In some implementations, method 500 may include other and/or additional steps that, for clarity, are not depicted. Further, in some implementations, method 500 may be executed in a different order than presented herein, wherein the order presented in the discussion of FIG. 5 is illustrative. Additionally, in some implementations, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for assisting users to generate the desired meme in a document, the method comprising:
   evaluating a document for at least one designated primary object within said document, wherein each of said at least one designated primary objects is evaluated in accordance with a type of meme;
   identifying terms providing one or more of positive and negative memes within said document, said terms being at least one of parts of speech, images, numerical text or numbers;
   assigning a score for each identified term;
   assigning a score for each of said at least one designated primary objects based on said score for said each identified term;
   displaying said at least one designated primary object with line markers to said each identified term; and
   providing, by a processor of a computing system, one or more options to modify said document in accordance with said type of meme for each of said at least one designated primary objects.

2. The method as recited in claim 1 further comprising:
   assigning said score for each of said at least one designated primary objects based on closeness in location of said each identified term with respect to each of said at least one designated primary objects in said document.

3. The method as recited in claim 1 further comprising:
   receiving one or more identifiers to identify each of said at least one designated primary objects.

4. The method as recited in claim 3 further comprising:
   assigning said score for each of said at least one designated primary objects based on closeness in location of said each identified term to said one or more identifiers used to identify each of said at least one designated primary objects in said document.

5. The method as recited in claim 1 further comprising:
   assigning said score for each of said at least one designated primary objects based on heat map locations.

6. The method as recited in claim 1 further comprising:
   modifying said document according to one or more of said one or more options.

7. A method for assisting users to maintain the desired meme established in a document, the method comprising:
   reviewing a document posted on a network in the context of its environment;
   identifying a change in the effectiveness of a meme of said document as a result of its environment; and
   informing, by a processor of a computing system, an author of said document that the effectiveness of said meme of said document has been changed in response to said identifying said change in the effectiveness of said meme of said document.

8. A computer program product embodied in a computer readable storage medium, wherein the medium does not include a propagating signal, for assisting users to generate the desired meme in a document, the computer program product comprising the programming instructions for:
   evaluating a document for at least one designated primary object within said document, wherein each of said at least one designated primary objects is evaluated in accordance with a type of meme;
   identifying terms providing one or more of positive and negative memes within said document, said terms being at least one of parts of speech, images, numerical text or numbers;
   assigning a score for each identified term;
   assigning a score for each of said at least one designated primary objects based on said score for said each identified term;
   displaying said at least one designated primary object with line markers to said each identified term; and
   providing one or more options to modify said document in accordance with said type of meme for each of said at least one designated primary objects.

9. The computer program product as recited in claim 8 further comprising the programming instructions for:
   assigning said score for each of said at least one designated primary objects based on closeness in location of said each identified term with respect to each of said at least one designated primary objects in said document.

10. The computer program product as recited in claim 8 further comprising the programming instructions for:
    receiving one or more identifiers to identify each of said at least one designated primary objects.

11. The computer program product as recited in claim 10 further comprising the programming instructions for:
    assigning said score for each of said at least one designated primary objects based on closeness in location of said each identified term to said one or more identifiers used to identify each of said at least one designated primary objects in said document.

12. The computer program product as recited in claim 8 further comprising the programming instructions for:
    assigning said score for each of said at least one designated primary objects based on heat map locations.

13. The computer program product as recited in claim 8 further comprising the programming instructions for:
    modifying said document according to one or more of said one or more options.

14. A system, comprising:
    a memory unit for storing a computer program for assisting users to generate the desired meme in a document; and
    a processor coupled to said memory unit, wherein said processor, responsive to said computer program, comprises:
        circuitry for evaluating a document for at least one designated primary object within said document, wherein each of said at least one designated primary objects is evaluated in accordance with a type of meme;
        circuitry for identifying terms providing one or more of positive and negative memes within said document, said terms being at least one of parts of speech, images, numerical text or numbers;

circuitry for assigning a score for each identified term;

circuitry for assigning a score for each of said at least one designated primary objects based on said score for said each identified term;

circuitry for displaying said at least one designated primary object with line markers to said each identified term; and circuitry for providing one or more options to modify said document in accordance with said type of meme for each of said at least one designated primary objects.

15. The system as recited in claim 14, wherein said processor further comprises:

circuitry for assigning said score for each of said at least one designated primary objects based on closeness in location of said each identified term with respect to each of said at least one designated primary objects in said document.

16. The system as recited in claim 14, wherein said processor further comprises:

circuitry for receiving one or more identifiers to identify each of said at least one designated primary objects.

17. The system as recited in claim 16, wherein said processor further comprises:

circuitry for assigning said score for each of said at least one designated primary objects based on closeness in location of said each identified term to said one or more identifiers used to identify each of said at least one designated primary objects in said document.

18. The system as recited in claim 14, wherein said processor further comprises:

circuitry for assigning said score for each of said at least one designated primary objects based on heat map locations.

19. The system as recited in claim 14, wherein said processor further comprises:

circuitry for modifying said document according to one or more of said one or more options.

\* \* \* \* \*